United States Patent
Bressler et al.

(10) Patent No.: US 12,065,371 B2
(45) Date of Patent: Aug. 20, 2024

(54) SYSTEM AND PROCESS FOR FORMING CURVED GLASS LAMINATE ARTICLE UTILIZING GLASS VISCOSITY DIFFERENTIAL FOR IMPROVED SHAPE MATCHING

(71) Applicant: CORNING INCORPORATED, Corning, NY (US)

(72) Inventors: Douglas Dale Bressler, Julian, PA (US); Anurag Jain, Painted Post, NY (US); Zheming Zheng, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 595 days.

(21) Appl. No.: 16/753,994

(22) PCT Filed: Oct. 5, 2018

(86) PCT No.: PCT/US2018/054712
§ 371 (c)(1),
(2) Date: Apr. 6, 2020

(87) PCT Pub. No.: WO2019/071199
PCT Pub. Date: Apr. 11, 2019

(65) Prior Publication Data
US 2020/0325056 A1    Oct. 15, 2020

(51) Int. Cl.
*C03B 27/044* (2006.01)
*C03B 23/025* (2006.01)
(Continued)

(52) U.S. Cl.
CPC .......... *C03B 23/0252* (2013.01); *C03C 3/087* (2013.01); *C03C 3/091* (2013.01);
(Continued)

(58) Field of Classification Search
CPC .............. C03B 23/0252; C03B 40/033; C03B 23/0258; B32B 37/18; B32B 37/12; B32B 17/06; B32B 7/12; C03C 27/10
See application file for complete search history.

(56) References Cited

U.S. PATENT DOCUMENTS 2,827,739 A * 3/1958 Atkeson .................. B29C 53/04
                                                          D12/183
3,281,232 A * 10/1966 Wright .................. C03B 23/027
                                                          65/289
(Continued)

FOREIGN PATENT DOCUMENTS

CN      103443045 A     12/2013
CN      104703940 A     6/2015
(Continued)

OTHER PUBLICATIONS

EAG Laboratories, Physical properties of glass, 2015, https://www.eag.com/services/materials/physical-properties-of-glass/ (Year: 2015).*
(Continued)

*Primary Examiner* — Alison L Hindenlang
*Assistant Examiner* — Steven S Lee
(74) *Attorney, Agent, or Firm* — William M. Johnson; Payal A. Patel; Kevin M. Able (57) ABSTRACT

A system and process for forming a curved glass laminate article is provided. The process and system utilizes co-sagging of a stack of glass sheets of different thicknesses and different glass materials. During co-sagging the thicker glass layer is placed on top of the thinner glass layer. In this process, shape mismatch is avoided by selecting/controlling the glass materials of the sheets of glass such that the viscosity of the lower, thinner sheet during co-sagging is greater than the viscosity of the thicker glass sheet.

8 Claims, 7 Drawing Sheets

(51) Int. Cl.
  *C03B 27/012* (2006.01)
  *C03C 3/087* (2006.01)
  *C03C 3/091* (2006.01)
  *C03C 27/10* (2006.01)
  *C03B 27/04* (2006.01)

(52) U.S. Cl.
  CPC .......... *C03C 27/10* (2013.01); *C03B 23/0258* (2013.01); *C03C 2201/10* (2013.01); *C03C 2201/50* (2013.01)

(56) References Cited

U.S. PATENT DOCUMENTS

| | | | | |
|---|---|---|---|---|
| 3,737,294 | A * | 6/1973 | Smith | ............... C03C 3/091 65/121 |
| 4,909,820 | A * | 3/1990 | Hirotsu | ............ C03B 23/0307 65/273 |
| 4,979,977 | A * | 12/1990 | Frank | ............ C03B 23/0252 65/288 |
| 5,383,990 | A * | 1/1995 | Tsuji | ............ C03B 23/0305 65/106 |
| 6,582,799 | B1 * | 6/2003 | Brown | ............ B32B 17/10036 428/34 |
| 9,387,651 | B2 | 7/2016 | Cleary et al. | |
| 2011/0277506 | A1 * | 11/2011 | Lewandowski | ..... C03B 23/0302 65/273 |
| 2011/0314871 | A1 * | 12/2011 | Olivier | ............... C03B 23/027 65/106 |
| 2013/0313852 | A1 * | 11/2013 | Balduin | ............... C03B 23/03 65/273 |
| 2014/0011000 | A1 * | 1/2014 | Dunkmann | ............... B60J 1/008 65/106 |
| 2014/0065374 | A1 * | 3/2014 | Tsuchiya | ........... B32B 17/10761 428/174 |
| 2014/0093702 | A1 * | 4/2014 | Kitajima | ........... B32B 17/10889 65/24 |
| 2015/0202854 | A1 * | 7/2015 | Tsuchiya | ................ B32B 1/00 428/179 |
| 2015/0246839 | A1 * | 9/2015 | Leveque | ........... B32B 17/10889 65/273 |
| 2016/0250825 | A1 | 9/2016 | Cleary et al. | |
| 2016/0297169 | A1 | 10/2016 | Notsu et al. | |
| 2016/0354996 | A1 * | 12/2016 | Alder | ..................... C03C 3/091 |
| 2017/0021597 | A1 * | 1/2017 | Michetti | ........... B32B 17/10935 |

FOREIGN PATENT DOCUMENTS

| | | | | |
|---|---|---|---|---|
| EP | 3078488 A1 | 10/2016 | | |
| WO | WO-03059836 A1 * | 7/2003 | .......... C03B 23/023 |
| WO | 2014/209861 A1 | 12/2014 | | |
| WO | WO-2015164241 A1 * | 10/2015 | ........ B23K 26/0869 |
| WO | WO-2016019209 A1 * | 2/2016 | ........ C03B 23/0252 |
| WO | WO-2016083862 A1 * | 6/2016 | .......... C03B 23/025 |

OTHER PUBLICATIONS

Welch et al, Dynamics of Glass Relaxation at Room Temperature, 2013, Physical Review Letters 110, 265901 (Year: 2013).*
International Search Report and Written Opinion of the International Searching Authority; PCT/US2018/054712; Mailed Feb. 28, 2019; 15 Pages; European Patent Office.
Chinese Patent Application No. 201880065265.6, Office Action dated Mar. 2, 2022, 21 pages (13 pages of English Translation and 8 pages of Original), Chinese Patent Office.

* cited by examiner

SYSTEM AND PROCESS FOR FORMING CURVED GLASS LAMINATE ARTICLE UTILIZING GLASS VISCOSITY DIFFERENTIAL FOR IMPROVED SHAPE MATCHING

CROSS-REFERENCE TO RELATED APPLICATIONS

This application is a national stage application under 35 U.S.C. § 371 of International Application No. PCT/US2018/054712, filed on Oct. 5, 2018, which claims the benefit of priority under 35 U.S.C. § 119 of U.S. Provisional Application Ser. No. 62/568,879 filed on Oct. 6, 2017, the content of which is relied upon and incorporated herein by reference in its entirety.

BACKGROUND

The disclosure relates generally to forming a curved glass laminate article, and specifically to processes for co-forming (e.g., co-sagging) glass sheets utilizing the relative viscosities of the glass sheets during co-forming to improve shape match of the layers. Curved glass laminate sheets or articles find use in many applications, particularly as for vehicle or automotive window glass. Typically, curved glass sheets for such applications have been formed from relatively thick sheets of glass material. To improve shape consistency between individual glass layers of the laminate article, the glass materials may be shaped to the desired shape/curvature via a co-forming process, such as a co-sagging process. Applicant has found that traditional co-sagging processes may produce undesirable characteristics (e.g., shape mismatch, edge wrinkling, bend-dots, etc.) in the curved glass sheets, the severity of which appears to increase as the differences between the glass sheets, such as thickness, increases.

SUMMARY

One embodiment of the disclosure relates to a process for forming a curved glass laminate article. The process includes placing an outer region of a first sheet of glass material into contact with a support surface of a shaping frame. The shaping frame defines an open central cavity surrounded at least in part by the support surface, and the first sheet of glass material has a first average thickness, $T1$, and is formed from a first glass composition. The method includes placing a second sheet of glass material on top of the first sheet of glass material, and the first sheet of glass material and the second sheet of glass material are both supported by the shaping frame. The second sheet of glass material has a second average thickness, $T2$, and is formed from a second glass composition different from the first glass composition. The process includes heating the first sheet of glass material and the second sheet of glass material together to a forming temperature above glass transition temperatures of both the first glass composition and the second glass composition while supported by the shaping frame such that central regions of the first and second sheets of glass material deform downward into the open central cavity of the shaping frame. In the process, $T2$ is greater than $T1$, and a viscosity of the first glass composition at the forming temperature, $V1$, is greater than a viscosity of the second glass composition at the forming temperature, $V2$.

An additional embodiment of the disclosure relates to a process for forming a curved multi-layer glass article. The process includes supporting a first sheet of glass material on a shaping frame. The process includes placing a second sheet of glass material on top of the first sheet of glass material. The first sheet of glass material and the second sheet of glass material are both supported by the shaping frame. The first sheet of glass material has a first average thickness, $T1$, and is formed from a first glass composition. The second sheet of glass material has a first average thickness, $T2$, and is formed from a second glass composition different from the first glass composition. The process includes heating the first sheet of glass material and the second sheet of glass material together to a forming temperature above glass transition temperatures of both the first glass composition and the second glass composition while supported by the shaping frame. The process includes deforming the first sheet of glass material and the second sheet of glass material into curved shapes during heating. In the process, $T2/T1>1$. The first glass composition comprises a viscosity at the forming temperature, $V1$, and the second glass composition comprises a viscosity at the forming temperature, $V2$. In the process, $V1/V2>2$.

An additional embodiment of the disclosure relates to a glass laminate article. The article includes a first glass layer and a second glass layer. The first glass layer includes an inner surface, an outer surface opposite the inner surface and an average thickness between the inner and outer surfaces of $T1$. The first glass layer includes a first glass composition having a viscosity, $V1$. In one or more embodiments, the first glass layer may optionally be strengthened. The second glass layer includes an inner surface, an outer surface, an average thickness between the inner and outer surfaces of $T2$ and a second glass composition having a viscosity, $V2$. $V1$ and $V2$ are measured at a temperature above glass transition temperatures of both the first glass composition and the second glass composition. The article includes a polymer interlayer located between the first glass layer and the second glass layer. $T2$ is greater than $T1$, and $V1/V2>2$. Both the first glass layer and the second glass layer are curved such that the inner surface of the first glass layer defines a radius of curvature and the outer surface of the second glass layer defines a radius of curvature.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of a system and method for shaping, bending or sagging a stack of glass sheets for formation of a curved, glass laminate article are shown and described. In general, conventional processes for forming curved, laminated glass articles involve heating a pair of stacked glass plates or sheets on a forming ring to near the softening temperature of the glass until the glass has sagged to the desired shape and depth. However, Applicant has found that various defects may be formed during co-sagging particularly when attempting to co-sag glass sheets of different thicknesses and material types.

For example, when co-sagging glass sheets of different thickness, it has been found that a thicker glass sheet will produce a more parabolic shape, and a thinner glass sheet will produce a "bath tub" like shape where curvature is greatest near the edges and is reduced near the center. This shape mismatch can be measured as the sagging differential between the two sheets, measured at the sheet center points, during a co-sagging cycle. In typical asymmetrical co-sagging arrangements this tendency of the thinner glass layer to form the "bath tub" defect has been addressed by co-sagging with the thinner glass sheet on top of the thicker glass sheet. In this arrangement, the thicker glass sheet tends to restrain the tendency of the thinner glass sheet to sag faster than the thick glass sheet, which helps to eliminate the "bath tub" shape mismatch defect. However, Applicant has determined that this approach to co-sagging introduces other problems/defects into the co-sagged glass pair, such as edge wrinkling and various optical defects, such as bending dots.

As discussed herein, Applicant has found that bath tub shape mismatch present in prior asymmetrical co-sagging processes can be addressed by a co-sagging process in which the thinner glass sheet is located below the thicker glass sheet. In such a process, to avoid the "bath-tub" defect that typically is formed when this sagging arrangement is used, the relative viscosities and thicknesses of the glass sheets are controlled such that the thinner glass sheet and the thicker glass sheet sag at substantially the same rate, providing improved shape match between the glass layers formed by this process. Further, Applicant believes that this approach to addressing "bath tub" defect may also decreases the formation of the edge wrinkle and optical defects formed in a co-sagging process where the thin glass layer is located on top of the thick glass layer.

Figure 1:
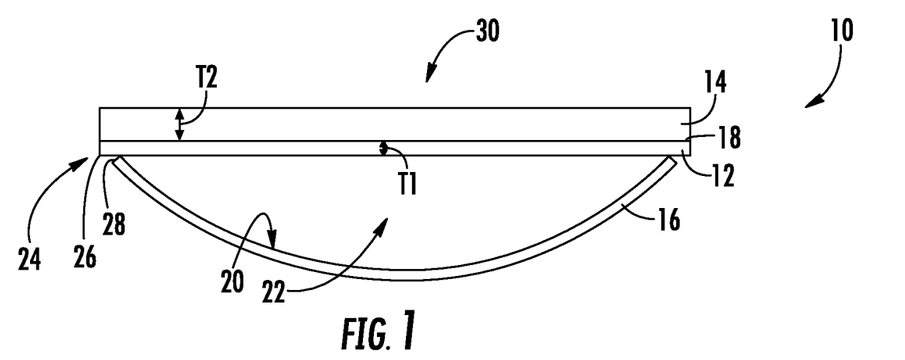
FIG. 1 is a schematic, cross-sectional view showing stacked glass sheets supported on a frame, according to an exemplary embodiment.
Figure 2:
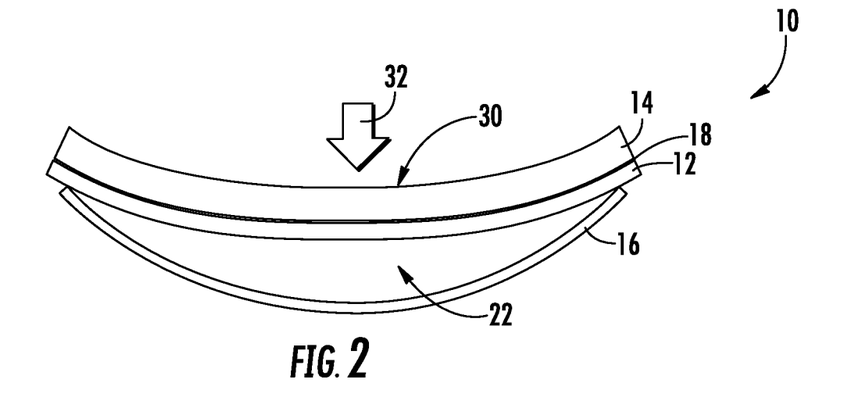
FIG. 2 is a schematic, cross-sectional view of the stacked glass sheets of FIG. 1 during co-sagging, according to an exemplary embodiment.

Referring to FIG. 1 and FIG. 2, a system and process for forming a curved glass article is shown according to an exemplary embodiment. In general, system 10 includes one or more sheets of glass material, shown as a pair of glass sheets 12 and 14, supported by a shaping frame, shown as bending ring 16. It should be understood that bending ring 16 may have a wide variety of shapes selected based on the shape of the glass sheets to be supported, and use of the term ring does not necessarily denote a circular shape.

As shown in FIGS. 1 and 2, a separation material 18 is located between glass sheets 12 and 14, and in a specific embodiment, separation material 18 is applied to an upper surface of lower glass sheet 12. In this arrangement, separation material 18 acts as a barrier between glass layers 12 and 14 preventing the glass sheets 12 and 14 from bonding together at the high temperatures during the sagging process. In specific embodiments, separation material 18 is a layer of particles, such as talc particles, that are deposited between sheets 12 and 14.

As shown in FIG. 1, bending ring 16 includes a radially inward facing surface 20 that defines an open central region or cavity 22. To begin the shaping process, an outer region 24 of glass sheet 12 adjacent the outer perimeter edge 26 of the glass sheet is placed into contact with a support surface, shown as upward facing surface 28, of bending ring 16. Next with separation material 18 located between the two glass sheets, upper glass sheet 14 is placed onto separation material 18 such that a lower surface of upper glass sheet 14 is in contact with separation material 18. In this arrangement, glass sheet 14 is on top of glass sheet 12, and glass sheets 12 and 14 are both supported by the contact between upward facing surface 28 of bending ring 16 and glass sheet 12 such that central regions 30 of glass sheets 12 and 14 are supported over central cavity 22.

Next, referring to FIG. 2, bending ring 16, supported glass sheets 12 and 14 and separation material 18 are moved into a heating station, such as an oven or serial indexing lehr. Within the heating station, glass sheets 12 and 14, separation material 18 and bending ring 16 are heated to a temperature above the glass transition temperatures of the glass material of glass sheets 12 and 14, while glass sheets 12 and 14 are supported on bending ring 16. As glass sheets 12 and 14 are heated, a shaping force, such as the downward force 32, causes central regions 30 of glass sheets 12 and 14 to deform or sag downward into central cavity 22 of bending ring 16.

In specific embodiments, downward force 32 is provided by gravity. In some embodiments, the downward force 32 may be provided via air pressure (e.g., creating a vacuum on the convex side of glass sheets 12 and 14, blowing air on the concave side of glass sheets 14, via press) or through a contact-based molding machine. Regardless of the source of the deforming force, this procedure results in glass sheets 12 and 14 having a curved shape as shown in FIG. 2.

After a period of time determined to allow glass sheets 12 and 14 to develop the desired curved shape, bending ring 16 along with the supported glass sheets 12 and/or 14 are then cooled to room temperature. Thus, the shaped, deformed or curved glass sheets 12 and 14 are allowed to cool, fixing glass sheets 12 and 14 into the curved shape created within the heating station. Once cooled, curved glass sheets 12 and 14 are removed from bending ring 16.

Figure 3:
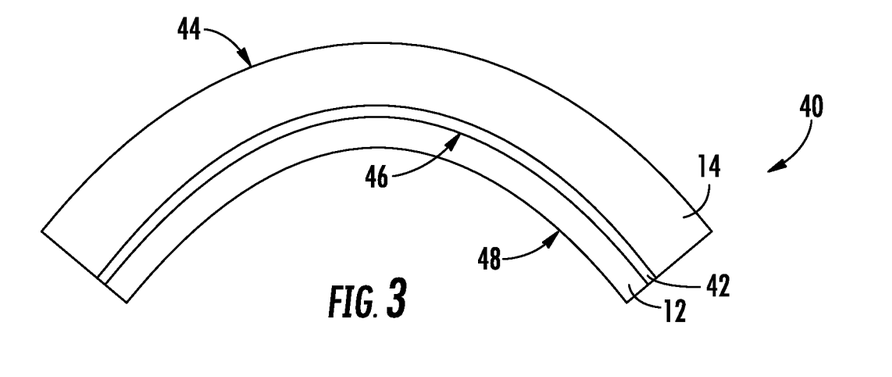
FIG. 3 is a schematic, cross-sectional view of a curved glass laminate article, according to an exemplary embodiment.

Referring to FIG. 3, following shaping, the now cooled and curved glass sheets 12 and 14 are bonded together into the final curved glass, laminate article 40. In specific embodiments curved glass sheets 12 and 14 are bonded together via a polymer interlayer 42, such as a polyvinyl butyral layer. As shown in FIG. 3, both glass layers 12 and 14 of glass laminate article 40 are curved such that outer surface 44 of glass layer 14 defines a radius of curvature, and the inner surface 46 of glass layer 12 defines a radius of curvature. In the particular embodiment shown in FIG. 3, both outer surface 44 and inner surface 46 define convex curved surfaces.

In one or more embodiments, the radius of curvature of the outer surface 44 of glass layer 14 and the radius of curvature for the inner surface 46 of the glass layer 12 is within 20% of one another, within 18% of one another, within 16% of one another, within 15% of one another, within 14% of one another, within 12% of one another, within 10% of one another, within 8% of one another, within 6% of one another, within 5% of one another, within 4% of one another, within 3% of one another, within 2% of one another, or within 1% of one another. As used herein, the term "radius of curvature" refers to the maximum radius of curvature of both the glass layer 12 and the glass layer 14 as measured on the inner surface 46 or outer surface 44, respectively.

In some embodiments, glass article 40 is used for an automotive glazing application. In such embodiments, surface 44 is an exterior surface facing away from the vehicle, and outer surface 48 of layer 12 faces the interior of the vehicle. In various embodiments the process discussed herein forms a glass article 40 in which outer surface 44 of layer 14 does not directly contact bending ring 16, which is believed to increase quality/reduce defects that may otherwise be present in surface 44 due to contact with the bending ring in conventional processes.

Referring back to FIG. 1 and FIG. 2, the process discussed herein provides for co-sagging of glass layers/sheets that have different thicknesses from each other and different viscosities from each other while reducing the shape mismatch that may otherwise be formed due to differential sagging speeds. As shown in FIG. 1, glass sheet 12 has a thickness, shown as T1, and glass sheet 14 has a thickness, shown as T2. In various embodiments, T1 is an average thickness measured between the opposing inner and outer major surface of glass sheet 12, and T2 is an average thickness measured between the opposing inner and outer major surface of glass sheet 14.

In addition to having different thicknesses, glass sheets 12 and 14 are formed from different glass compositions from each other. In such embodiments, the glass composition of glass sheet 12 has a viscosity, V1, measured at the peak co-sagging temperature and/or measured at any other temperature above the glass transition temperatures of the glass material of sheet 12, and the glass composition of glass sheet 14 has a viscosity, V2, measured at the peak co-sagging temperature and/or measured at any other temperature above the glass transition temperatures of the glass material of sheet 14.

In general, in the co-sagging process disclosed herein and as shown in FIG. 1, T2 is greater than T1. Thus, in the stacked arrangement of the present disclosure the thicker glass sheet, sheet 14, is located on top of the thinner glass sheet 12. It is Applicant's understanding that conventional wisdom indicates that this arrangement should result in significant shape mismatch, because the thinner glass sheet is typically sags away from the thicker glass sheet resulting in the "bath tub" shape mismatch defect. However, contrary to conventional wisdom and as will be discussed in more detail below, Applicant has determined that the co-sagging stacked arrangement shown in FIG. 1 can be utilized without formation of significant shape mismatch when the relative viscosities of glass sheets 12 and 14 are selected/controlled to meet particular relationships as discussed herein. In particular Applicant has determined that by selecting/controlling the glass viscosity, such that V1 is greater than V2, shape mismatch during co-sagging can be greatly reduced.

In general, T2 is greater than T1, and V1 is greater than V2 providing the decrease in shape mismatch. In some specific embodiments, T2/T1>2 and V1/V2>2. In some embodiments, 1.0≤T2/T1≤6.0, and 2≤V1/V2≤100. Applicant has found that the co-sagging arrangement generally shown in FIG. 1 results in a satisfactory level of shaping matching when these general thickness and viscosity relationships are met during co-sagging.

Applicant has discovered that as the thickness differential between layers 12 and 14 increase, the viscosity differential also needs to be increased to maintain the shape consistency during co-sagging in the arrangement of FIG. 1. As such, in a specific embodiment, T2/T1=3.0 and V1/V2>13. In another specific embodiment, T2/T1=3.8 and V1/V2>24. In another specific embodiment, T2/T1=5.8 and V1/V2>72.

In specific embodiments, T2 is between 1.5 mm and 4 mm, and T1 is between 0.3 mm and less than 1.5 mm, and in even more specific embodiments, T1 is less than 0.6 mm. In specific embodiments: T2 is 1.6 mm and T1 is 0.55 mm; T2 is 2.1 mm and T1 is 0.55 mm; T2 is 2.1 mm and T1 is 0.7 mm; T2 is 2.1 mm and T1 is 0.5 mm; T2 is 2.5 mm and T1 is 0.7 mm.

To provide the different relative viscosities, glass sheet 12 is formed from a first glass material/composition, and glass sheet 14 is formed from a second glass material/composition different from the first material. While a wide variety of glass materials may be used to form glass sheets 12 and/or 14. For example, the glass materials may include any one of soda lime silicate glass, aluminosilicate glass, alkali aluminosilicate glass, alkali aluminoborsilicate glass and the like. In specific embodiments, the glass material of sheet 14 is a soda lime silicate glass, and the glass material of sheet 12 is an alkali aluminosilicate glass composition or an alkali aluminoborosilicate glass composition. In a specific embodiment, sheet 12 is formed from a strengthened glass material such as a chemical strengthened glass material. Additional exemplary materials for glass sheets 12 and 14 are identified in detail below.

Referring to FIG. 3, in various embodiments, glass sheets 12 and/or 14 following curve formation may be utilized in a variety of applications. In specific embodiments, glass laminate article 40 produced via the systems and processes discussed herein are used to form vehicle (e.g., automotive) windows. In specific embodiments, laminate article 40 may form the sidelights, windshields, rear windows, windows, rearview mirrors, and sunroofs of a vehicle. As used herein, vehicle includes automobiles, rolling stock, locomotive, boats, ships, and airplanes, helicopters, drones, space craft and the like. In other embodiments, laminate article 40 may be used in a variety of other applications where thin, curved glass laminate articles may be advantageous, such as for architectural glass, building glass, etc.

Glass sheets 12 and/or 14 can be formed from a variety of materials. In specific embodiments, glass sheet 12 is formed from a chemically strengthened alkali aluminosilicate glass composition or an alkali aluminoborosilicate glass composition, and glass sheet 14 is formed from a soda lime silicate glass (SLG) composition. In specific embodiments, glass sheet 12 is formed from a chemically strengthened material, such as an alkali aluminosilicate glass material or an alkali aluminoborosilicate glass composition, having a chemically strengthened compression layer having a depth of compression (DOC) in a range from about 30 µm to about 90 µm, and a compressive stress on at least one of the sheet's major surfaces of between 300 MPa to 1000 MPa. In some embodiments, the chemically strengthened glass is strengthened through ion exchange.

Figure 4:
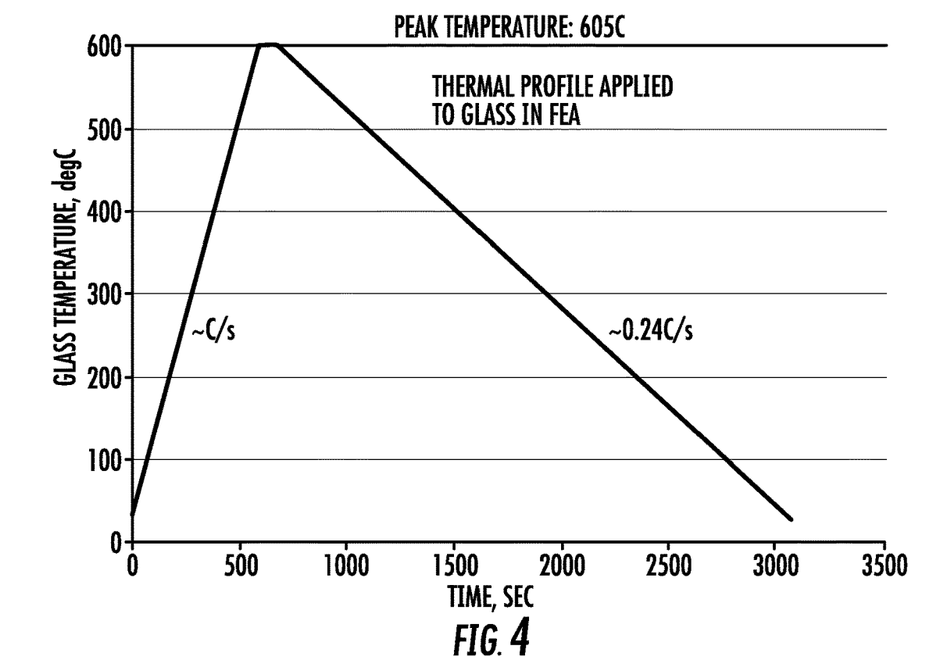
FIG. 4 is a plot of a thermal profile applied to the stack of glass sheets of FIG. 1 during co-sagging, according to an exemplary embodiment.
Figure 5:
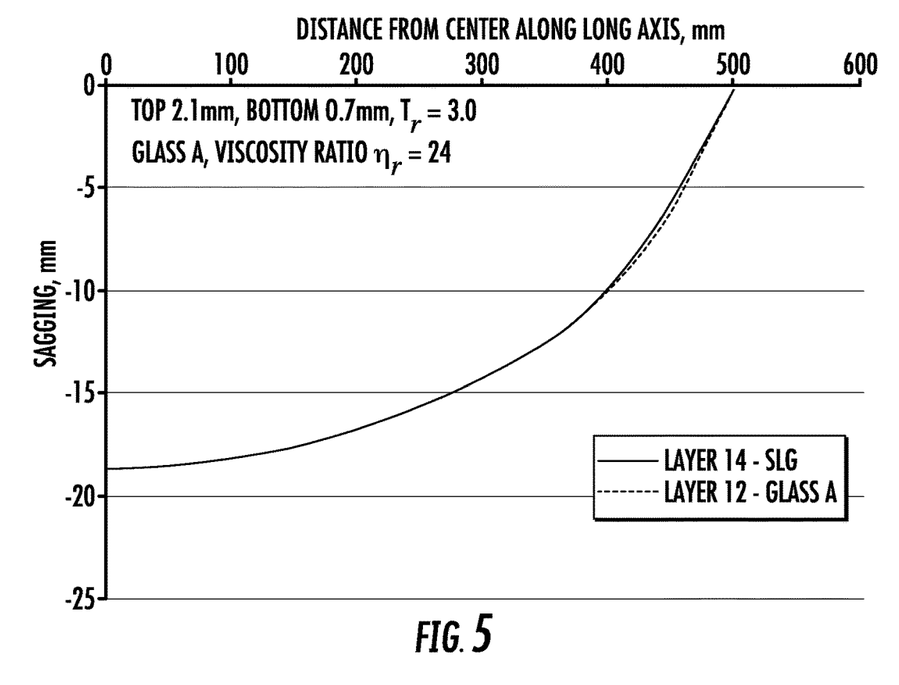
FIG. 5 shows sagging profiles of two glass sheets during co-sagging having a thickness ratio of 3.0 and a viscosity ratio of 24, according to an exemplary embodiment.
Figure 6:
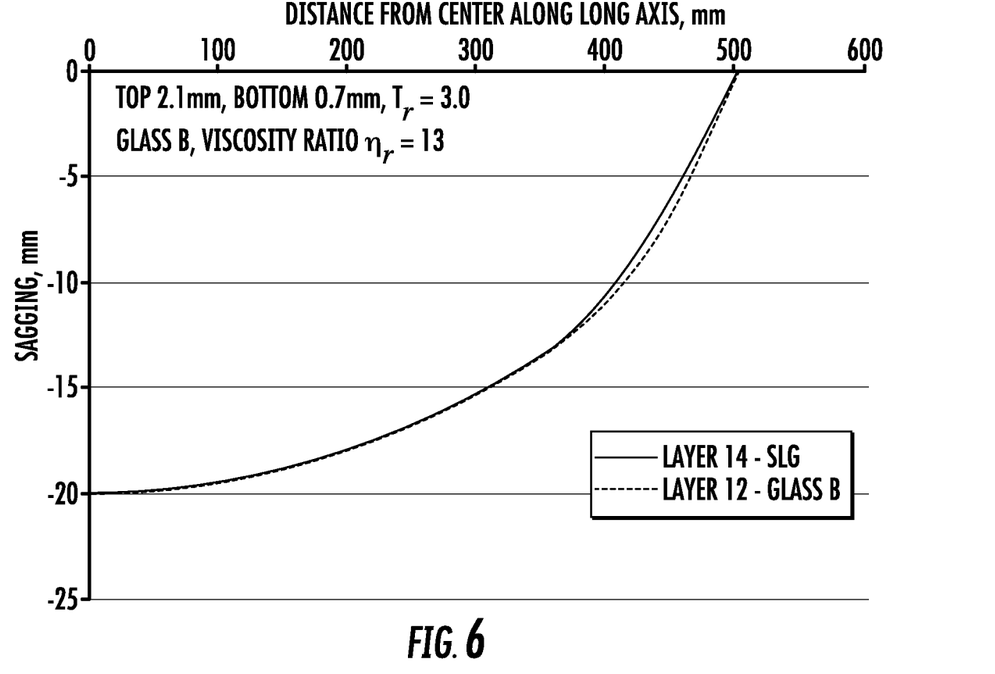
FIG. 6 shows sagging profiles of two glass sheets during co-sagging having a thickness ratio of 3.0 and a viscosity ratio of 13, according to an exemplary embodiment.
Figure 7:
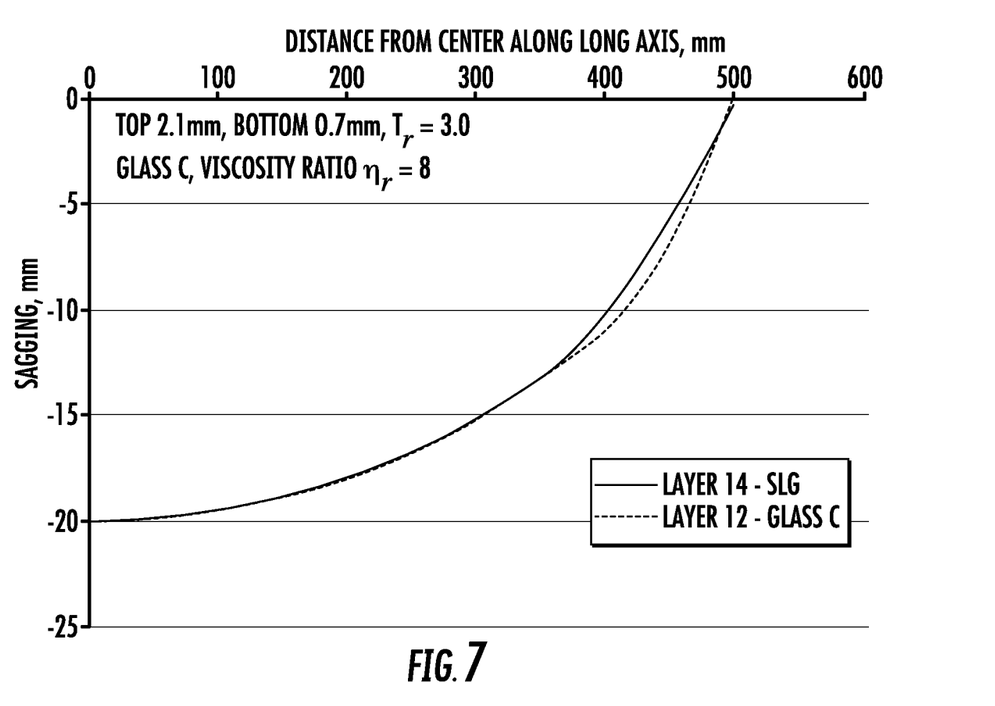
FIG. 7 shows sagging profiles of two glass sheets during co-sagging having a thickness ratio of 3.0 and a viscosity ratio of 8, according to an exemplary embodiment.
Figure 8:
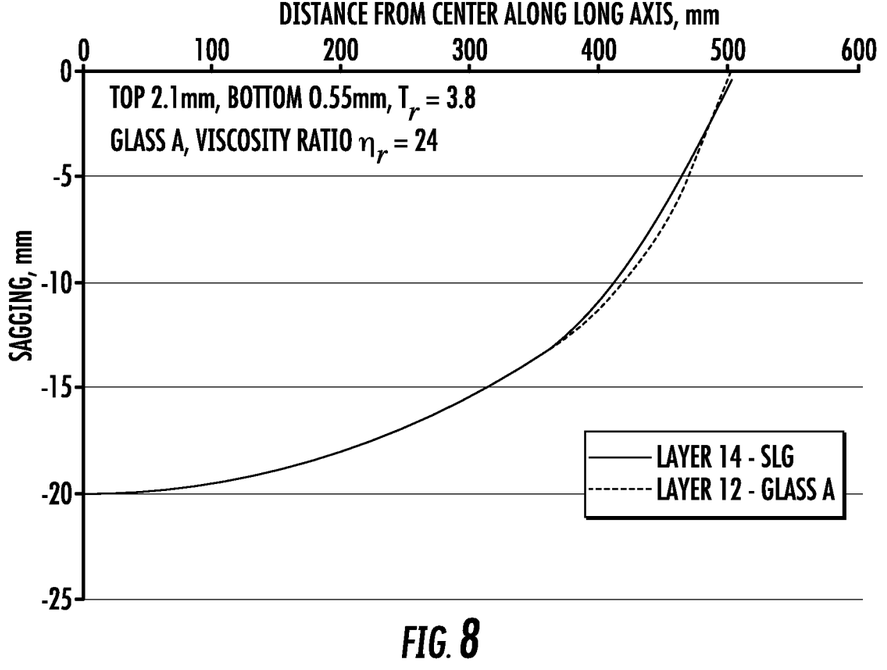
FIG. 8 shows sagging profiles of two glass sheets during co-sagging having a thickness ratio of 3.8 and a viscosity ratio of 24, according to an exemplary embodiment.
Figure 9:
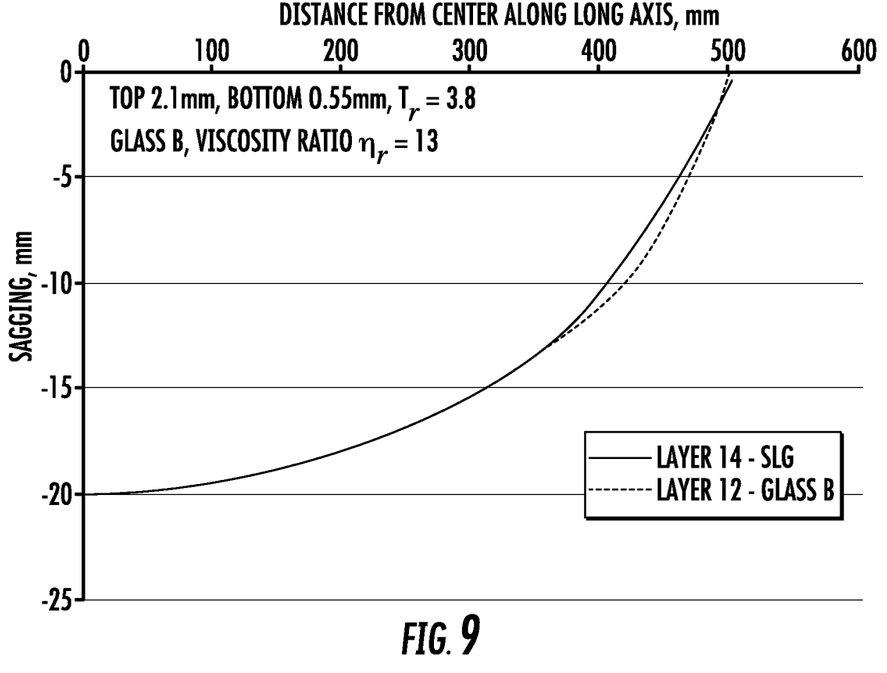
FIG. 9 shows sagging profiles of two glass sheets during co-sagging having a thickness ratio of 3.8 and a viscosity ratio of 13, according to an exemplary embodiment.
Figure 10:
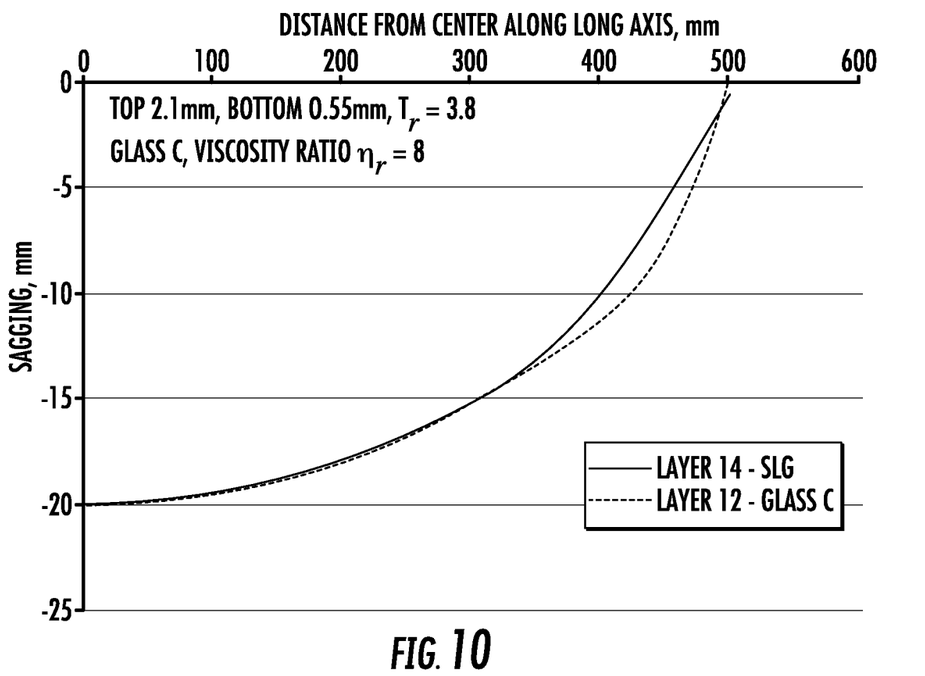
FIG. 10 shows sagging profiles of two glass sheets during co-sagging having a thickness ratio of 3.8 and a viscosity ratio of 8, according to an exemplary embodiment.
Figure 11:
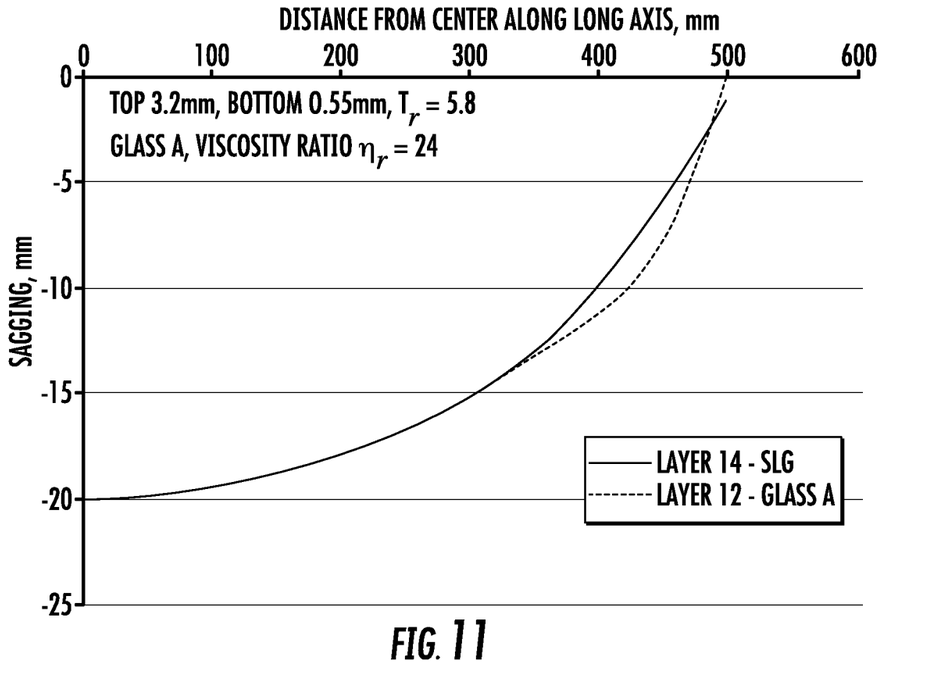
FIG. 11 shows sagging profiles of two glass sheets during co-sagging having a thickness ratio of 5.8 and a viscosity ratio of 24, according to an exemplary embodiment.
Figure 12:
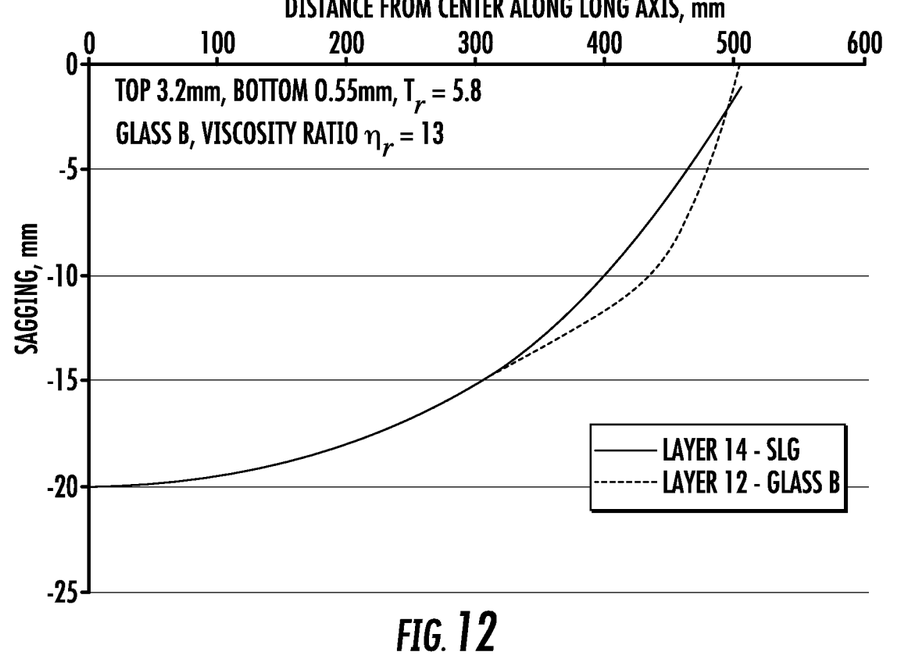
FIG. 12 shows sagging profiles of two glass sheets during co-sagging having a thickness ratio of 5.8 and a viscosity ratio of 13, according to an exemplary embodiment.
Figure 13:
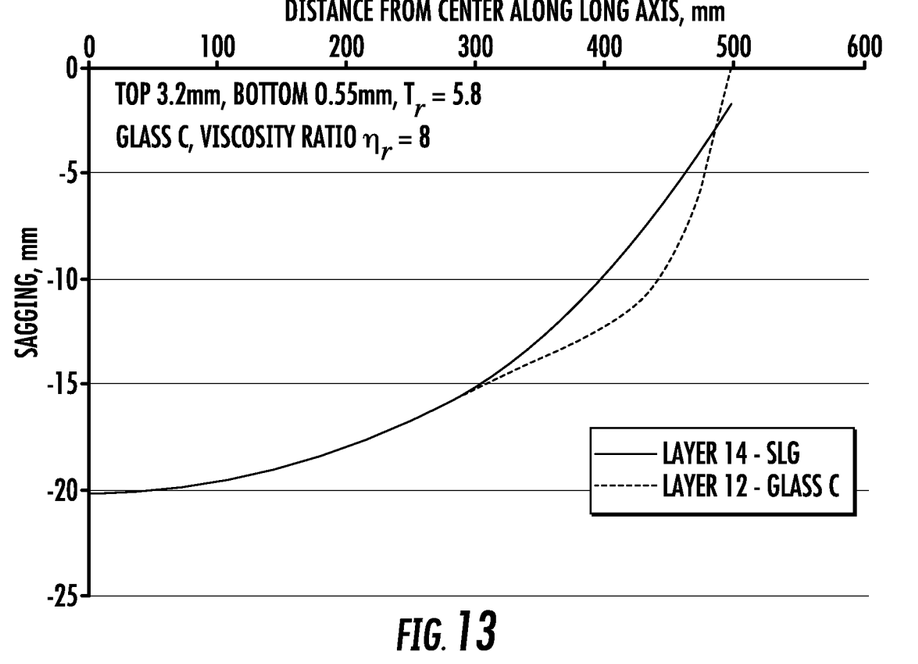
FIG. 13 shows sagging profiles of two glass sheets during co-sagging having a thickness ratio of 5.8 and a viscosity ratio of 8, according to an exemplary embodiment.
Figure 14:
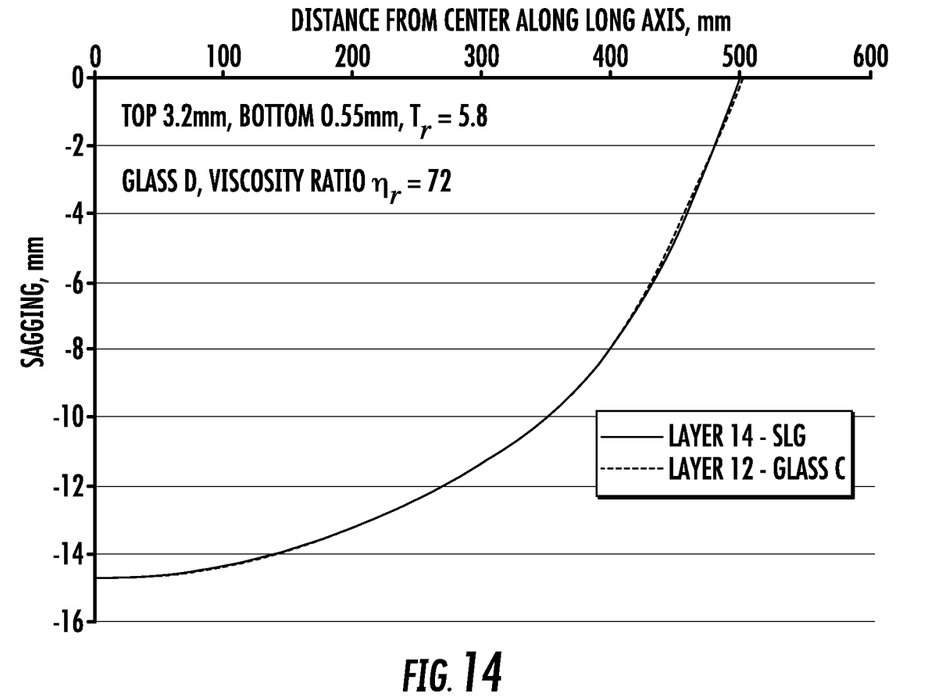
FIG. 14 shows sagging profiles of two glass sheets during co-sagging having a thickness ratio of 5.8 and a viscosity ratio of 72, according to an exemplary embodiment.

Referring to FIGS. 4-14, Applicant's finite element analysis (FEA) demonstrating the ability to utilize the viscosity ratio, V1/V2, to mitigate shape mismatch during co-sagging is disclosed. FIG. 4 shows the co-sagging heating profile used for the co-sagging FEA used to generate the data provided in FIGS. 5-14. The relevant glass properties used in the FEA analysis is provided in Table 1, below, and the different glass layer thicknesses used are shown in Table 2, below. In the FEA analysis glass layers 12 and 14 were modeled as rectangular glass sheets having width and length dimensions of 1500 mm by 1000 mm.

TABLE 1

|  | Layer 12 - Glass Material A | Layer 12 - Glass Material B | Layer 12 - Glass Material C | Layer 14 - Glass Material = SLG |
|---|---|---|---|---|
| Glass transition point, $T_g$ ($\eta = 10^{13}$ p), [° C.] | 578 | 562 | 554 | 549 |
| $\log_{10}\eta$ (T = 605° C.), [P] | 12.02 | 11.76 | 11.54 | 10.64 |
| Viscosity ratio ($\eta_r$) | 24 | 13 | 8 | 1 |

TABLE 2

|  | Glass Pair 1 | Glass Pair 2 | Glass Pair 3 |
|---|---|---|---|
| Layer 14 glass thickness | 2.1 mm | 2.1 mm | 3.2 mm |
| Layer 12 glass thickness | 0.7 mm | 0.55 mm | 0.55 mm |
| Thickness ratio (Tr) | 3.0 | 3.8 | 5.8 |

Each of FIGS. 5-14 show a plot of the sagging distance of layer 12 and of layer 14 for different viscosity ratios and different thickness ratios. As will generally be understood, the shape mismatch provided during co-sagging is represented as the gap between the sagging plots of layers 12 and 14 in FIGS. 5-14. As can be seen in FIGS. 5-14 as the thickness difference, given by the thickness ratio, $T_r=T2/T1$, increases, the viscosity difference, given by $\eta_r=V1/V2$ must also increase in order to decrease the creation of shape mismatch between the sagging shape of layers 12 and 14.

Figure 15:
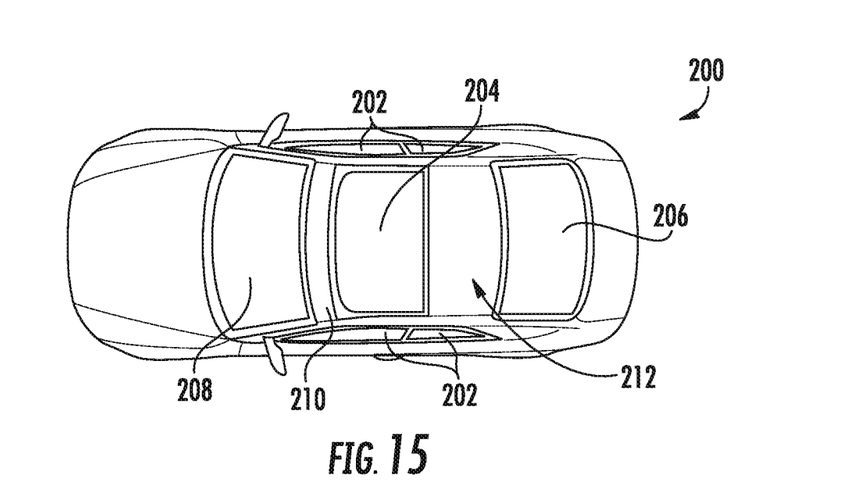
FIG. 15 shows a vehicle equipped with one or more glass laminate articles as discussed herein.

Referring to FIG. 15, use of glass laminate article 40 (FIG. 3) as part of a vehicle window, roof or side window, is shown. As shown, a vehicle 200 includes one or more side windows 202, a roof 204, a back window 206 and/or a windshield 208. In general, any of the embodiments of glass laminate article 40 discussed herein may be used for one or more side windows 202, a roof 204, a back window 206 and/or a windshield 208. In general, one or more side windows 202, a roof 204, a back window 206 and/or a windshield 208 are supported within an opening defined by vehicle frame or body 210 such that outer surface 48 of glass layer 12 (see FIG. 3) faces a vehicle interior 212. In this arrangement, outer surface 44 of glass layer 14 (see FIG. 3) faces toward the exterior of vehicle 200 and may define the outermost surface of vehicle 200 at the location of the glass article. As used herein, vehicle includes automobiles, rolling stock, locomotive, boats, ships, airplanes, helicopters, drones, space craft and the like. In other embodiments, glass laminate article 40 may be used in a variety of other applications where thin, curved glass laminate articles may be advantageous, such as for architectural glass, building glass, etc.

Examples of Glass Materials and Properties

In various embodiments, glass sheets 12 and/or 14 may be formed from any of a variety of strengthened glass compositions. Examples of glasses that may be used for glass sheets 12 and/or 14 described herein may include soda lime silicate glass compositions, alkali aluminosilicate glass compositions or alkali aluminoborosilicate glass compositions, though other glass compositions are contemplated. In one or more embodiments, the glass compositions may be characterized as ion exchangeable. As used herein, "ion exchangeable" means that the layer comprising the composition is capable of exchanging cations located at or near the surface of the glass layer with cations of the same valence that are either larger or smaller in size. In one exemplary embodiment, the glass composition of glass sheets 12 and/or 14 comprises $SiO_2$, $B_2O_3$ and $Na_2O$, where $(SiO_2+B_2O_3)\geq 66$ mol. %, and $Na_2O \geq 9$ mol. %. Suitable glass compositions for glass sheets 12 and/or 14, in some embodiments, further comprise at least one of $K_2O$, MgO, and CaO. In a particular embodiment, the glass compositions used in glass sheets 12 and/or 14 can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example of glass composition suitable for glass sheets 12 and/or 14 comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

Even further, another example of glass composition suitable for glass sheets 12 and/or 14 comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass composition suitable for glass sheets 12 and/or 14 comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $((Al_2O_3+B_2O_3)/\Sigma\text{modifiers})>1$, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $((Al_2O_3+B_2O_3)/\Sigma modifiers)>1$.

In still another embodiment, glass sheets 12 and/or 14 may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2$+$B_2O_3$+CaO≤69 mol. %; $Na_2O$+$K_2O$+$B_2O_3$+MgO+CaO+SrO>10 mol. %; 5 mol. %≤MgO+CaO+SrO≤8 mol. %; $(Na_2O+B_2O_3)-Al_2O_3$≤2 mol. %; 2 mol. %≤$Na_2O-Al_2O_3$≤6 mol. %; and 4 mol. %≤$(Na_2O+K_2O)-Al_2O_3$≤10 mol. %.

In an alternative embodiment, glass sheets 12 and/or 14 may comprise an alkali aluminosilicate glass composition comprising: 2 mol % or more of $Al_2O_3$ and/or $ZrO_2$, or 4 mol % or more of $Al_2O_3$ and/or $ZrO_2$. In one or more embodiments, glass sheets 12 and/or 14 comprise a glass composition comprising $SiO_2$ in an amount in the range from about 67 mol % to about 80 mol %, $Al_2O_3$ in an amount in a range from about 5 mol % to about 11 mol %, an amount of alkali metal oxides ($R_2O$) in an amount greater than about 5 mol % (e.g., in a range from about 5 mol % to about 27 mol %). In one or more embodiments, the amount of $R_2O$ comprises $Li_2O$ in an amount in a range from about 0.25 mol % to about 4 mol %, and $K_2O$ in an amount equal to or less than 3 mol %. In one or more embodiments, the glass composition includes a non-zero amount of MgO, and a non-zero amount of ZnO.

In other embodiments, glass sheets 12 and/or 14 are formed from a composition that exhibits $SiO_2$ in an amount in the range from about 67 mol % to about 80 mol %, $Al_2O_3$ in an amount in the range from about 5 mol % to about 11 mol %, an amount of alkali metal oxides ($R_2O$) in an amount greater than about 5 mol % (e.g., in a range from about 5 mol % to about 27 mol %), wherein the glass composition is substantially free of $Li_2O$, and a non-zero amount of MgO; and a non-zero amount of ZnO.

In other embodiments, glass sheets 12 and/or 14 are an aluminosilicate glass article comprising: a glass composition comprising $SiO_2$ in an amount of about 67 mol % or greater; and a sag temperature in a range from about 600° C. to about 710° C. In other embodiments, glass sheets 12 and/or 14 are formed from an aluminosilicate glass article comprising: a glass composition comprising $SiO_2$ in an amount of about 68 mol % or greater; and a sag temperature in a range from about 600° C. to about 710° C. (as defined herein).

In some embodiments, glass sheets 12 and/or 14 are formed from different glass materials from each other that differs in any one or more of composition, thickness, strengthening level, and forming method (e.g., float formed as opposed to fusion formed). In one or more embodiments, glass sheets 12 and/or 14 described herein have a sag temperature of about 710° C., or less or about 700° C. or less. In one or more embodiments, one of the glass sheets 12 and 14 is a soda lime silicate glass sheet, and the other of the glass sheets 12 and 14 is any one of the non-soda lime silicate glass materials discussed herein. In one or more embodiments, glass sheets 12 and/or 14 comprises a glass composition comprising $SiO_2$ in an amount in the range from about 68 mol % to about 80 mol %, $Al_2O_3$ in an amount in a range from about 7 mol % to about 15 mol %, $B_2O_3$ in an amount in a range from about 0.9 mol % to about 15 mol %; a non-zero amount of $P_2O_5$ up to and including about 7.5 mol %, $Li_2O$ in an amount in a range from about 0.5 mol % to about 12 mol %, and $Na_2O$ in an amount in a range from about 6 mol % to about 15 mol %.

In some embodiments, the glass composition of glass sheets 12 and/or 14 may include an oxide that imparts a color or tint to the glass articles. In some embodiments, the glass composition of glass sheets 12 and/or 14 includes an oxide that prevents discoloration of the glass article when the glass article is exposed to ultraviolet radiation. Examples of such oxides include, without limitation, oxides of: Ti, V, Cr, Mn, Fe, Co, Ni, Cu, Ce, W, and Mo.

Glass sheets 12 and/or 14 may have a refractive index in the range from about 1.45 to about 1.55. As used herein, the refractive index values are with respect to a wavelength of 550 nm. Glass sheets 12 and/or 14 may be characterized by the manner in which it is formed. For instance, glass sheets 12 and/or 14 may be characterized as float-formable (i.e., formed by a float process), down-drawable and, in particular, fusion-formable or slot-drawable (i.e., formed by a down draw process such as a fusion draw process or a slot draw process). In one or more embodiments, glass sheets 12 and/or 14 described herein may exhibit an amorphous microstructure and may be substantially free of crystals or crystallites. In other words, in such embodiments, the glass articles exclude glass-ceramic materials.

In one or more embodiments, glass sheets 12 and/or 14 exhibits an average total solar transmittance of about 88% or less, over a wavelength range from about 300 nm to about 2500 nm, when glass sheets 12 and/or 14 has a thickness of 0.7 mm. For example, glass sheets 12 and/or 14 exhibits an average total solar transmittance in a range from about 60% to about 88%, from about 62% to about 88%, from about 64% to about 88%, from about 65% to about 88%, from about 66% to about 88%, from about 68% to about 88%, from about 70% to about 88%, from about 72% to about 88%, from about 60% to about 86%, from about 60% to about 85%, from about 60% to about 84%, from about 60% to about 82%, from about 60% to about 80%, from about 60% to about 78%, from about 60% to about 76%, from about 60% to about 75%, from about 60% to about 74%, or from about 60% to about 72%.

In one or more embodiments, glass sheets 12 and/or 14 exhibit an average transmittance in the range from about 75% to about 85%, at a thickness of 0.7 mm or 1 mm, over a wavelength range from about 380 nm to about 780 nm. In some embodiments, the average transmittance at this thickness and over this wavelength range may be in a range from about 75% to about 84%, from about 75% to about 83%, from about 75% to about 82%, from about 75% to about 81%, from about 75% to about 80%, from about 76% to about 85%, from about 77% to about 85%, from about 78% to about 85%, from about 79% to about 85%, or from about 80% to about 85%. In one or more embodiments, glass sheets 12 and/or 14 exhibits $T_{uv-380}$ or $T_{uv-400}$ of 50% or less (e.g., 49% or less, 48% or less, 45% or less, 40% or less, 30% or less, 25% or less, 23% or less, 20% or less, or 15% or less), at a thickness of 0.7 mm or 1 mm, over a wavelength range from about 300 nm to about 400 nm.

In one or more embodiments, glass sheets 12 and/or 14 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, glass sheets 12 and/or 14 may be strengthened mechanically by utilizing a mismatch of the coefficient of thermal expansion between portions of the article to create a compressive stress region and a central region exhibiting a tensile stress. In some embodiments, the glass article may be strengthened thermally by heating the glass to a temperature below the glass transition point and then rapidly quenching.

In one or more embodiments, glass sheets 12 and/or 14 may be chemically strengthening by ion exchange. In the ion exchange process, ions at or near the surface of glass sheets 12 and/or 14 are replaced by—or exchanged with—larger ions having the same valence or oxidation state. In those embodiments in which glass sheets 12 and/or 14 comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into glass sheets 12 and/or 14 generate a stress.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

Aspect (1) pertains to a process for forming a curved glass laminate article comprising: placing an outer region of a first sheet of glass material into contact with a support surface of a shaping frame, the shaping frame defining an open central cavity surrounded at least in part by the support surface, wherein the first sheet of glass material has a first average thickness, T1, and is formed from a first glass composition; placing a second sheet of glass material on top of the first sheet of glass material, wherein the first sheet of glass material and the second sheet of glass material are both supported by the shaping frame, wherein the second sheet of glass material has a second average thickness, T2, and is formed from a second glass composition different from the first glass composition; and heating the first sheet of glass material and the second sheet of glass material together to a forming temperature above glass transition temperatures of both the first glass composition and the second glass composition while supported by the shaping frame such that central regions of the first and second sheets of glass material deform downward into the open central cavity of the shaping frame; wherein T2 is greater than T1.

Aspect (2) pertains to the process of Aspect (1), wherein a viscosity of the first glass composition at the forming temperature, V1, is greater than a viscosity of the second glass composition at the forming temperature, V2.

Aspect (3) pertains to the process of Aspect (1), wherein T2/T1>2.

Aspect (4) pertains to the process of Aspect (2), wherein V1/V2>2.

Aspect (5) pertains to the process of any one of Aspects (1) through (4), wherein $1.0 \leq T2/T1 \leq 6.0$ and $2 \leq V1/V2 \leq 100$.

Aspect (6) pertains to the process of any one of Aspects (1) through (5), wherein T2/T1=3.0 and V1/V2>13.

Aspect (7) pertains to the process of any one of Aspects (1) through (6), wherein T2/T1=3.8 and V1/V2>24.

Aspect (8) pertains to the process of any one of Aspects (1) through (7), wherein T2/T1=5.8 and V1/V2>72.

Aspect (9) pertains to the process of any one of Aspects (1) through (8), wherein T2 is between 1.5 mm and 4 mm, and T1 is between 0.3 mm and 1 mm.

Aspect (10) pertains to the process of any one of Aspects (1) through (9), wherein T1 is less than 0.6 mm.

Aspect (11) pertains to the process of any one of Aspects (1) through (10), wherein the first glass composition and the second glass composition are soda lime glass.

Aspect (12) pertains to the process of any one of Aspects (1) through (10), wherein the second glass composition is soda lime glass and the first glass composition is an alkali aluminosilicate glass composition or an alkali aluminoborosilicate glass composition.

Aspect (13) pertains to the process of any one of Aspects (1) through (12), further comprising applying a separation material between the first sheet of glass material and the second sheet of glass material such that the separation material contacts the first sheet of glass material and the second sheet of glass material while supported by the shaping frame.

Aspect (14) pertains to the process of Aspect (13), wherein the separation material is a layer of particles deposited onto the upper surface of the first sheet of glass material.

Aspect (15) pertains to a process for forming a curved multi-layer glass article comprising: supporting a first sheet of glass material on a shaping frame; placing a second sheet of glass material on top of the first sheet of glass material, wherein the first sheet of glass material and the second sheet of glass material are both supported by the shaping frame, wherein the first sheet of glass material has a first average thickness, T1, and is formed from a first glass composition and the second sheet of glass material has a first average thickness, T2; heating the first sheet of glass material and the second sheet of glass material together to a forming temperature above glass transition temperatures of both the first glass composition and the second glass composition while supported by the shaping frame; and deforming the first sheet of glass material and the second sheet of glass material into curved shapes during heating; wherein T2/T1>1.

Aspect (16) pertains to the process of Aspect (15), wherein the second sheet of glass material is formed from a second glass composition different from the first glass composition, and wherein the first glass composition comprises a viscosity at the forming temperature, V1, and the second glass composition comprises a viscosity at the forming temperature, V2.

Aspect (17) pertains to the process of Aspect (15), wherein $1.0 \leq T2/T1 \leq 6.0$.

Aspect (18) pertains to the process of Aspect (16), wherein $2 \leq V1/V2 \leq 100$.

Aspect (19) pertains to the process of any one of Aspects (15) through (18), wherein T2 is between 1 mm and 4 mm, and T1 is between 0.3 mm and 1 mm.

Aspect (20) pertains to the process of any one of Aspects (15) through (19), wherein T1 is less than 0.6 mm.

Aspect (21) pertains to the process of any one of Aspects (15) through (20), wherein the first glass composition and the second glass composition are soda lime silicate glass.

Aspect (22) pertains to the process of any one of Aspects (15) through (20), wherein the second glass composition is soda lime silicate glass and the first glass composition is an alkali aluminosilicate glass composition or an alkali aluminoborosilicate glass composition.

Aspect (23) pertains to the process of any one of Aspects (15) through (22), further comprising applying a separation material between the first sheet of glass material and the second sheet of glass material such that the separation material contacts the first sheet of glass material and the second sheet of glass material while supported by the shaping frame.

Aspect (24) pertains to the process of any one of Aspects (15) through (23), wherein the shaping frame defines an open central cavity, and central regions of the first and second sheets of glass material deform downward into the open central cavity of the shaping frame during heating.

Aspect (25) pertains to a glass laminate article comprising: a first glass layer comprising: an inner surface; an outer surface opposite the inner surface; an average thickness between the inner and outer surfaces of T1; and a first glass composition having a viscosity, V1; a second glass layer comprising: an inner surface; an outer surface; an average thickness between the inner and outer surfaces of T2; and a second glass composition having a viscosity, V2; wherein V1 and V2 are measured at a temperature above glass transition temperatures of both the first glass composition and the second glass composition; and polymer interlayer located between the first glass layer and the second glass layer; wherein T2 is greater than T1; wherein both the first glass layer and the second glass layer are curved such that the inner surface of the first glass layer defines a radius of curvature and the outer surface of the second glass layer defines a radius of curvature that is within 20% of the radius of curvature of the first glass layer.

Aspect (26) pertains to the glass laminate article of Aspect (25), wherein V1/V2>2.

Aspect (27) pertains to the glass laminate article of Aspect (25) or Aspect (26), wherein T2 is between 1 mm and 4 mm, and T1 is between 0.3 mm and 1 mm.

Aspect (28) pertains to the glass laminate article of any one of Aspects (25) through (27), wherein $1.0 \leq T2/T1 \leq 6.0$.

Aspect (29) pertains to the glass laminate article of any one of Aspects (25) through (28), wherein $2 \leq V1/V2 \leq 100$.

Aspect (30) pertains to the glass laminate article of any one of Aspects (25) through (27), wherein the second glass composition is soda lime silicate glass and the first glass composition is a soda lime silicate glass composition, an alkali aluminosilicate glass composition or an alkali aluminoborosilicate glass composition.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A process for forming a curved glass laminate article comprising:
    placing an outer region of a first sheet of glass material into contact with a support surface of a shaping frame, the shaping frame defining an open central cavity surrounded at least in part by the support surface, wherein the first sheet of glass material has a first average thickness, T1, and is formed from a first glass composition;
    placing a second sheet of glass material on top of the first sheet of glass material, wherein the first sheet of glass material and the second sheet of glass material are both supported by the shaping frame, wherein the second sheet of glass material has a second average thickness, T2, and is formed from a second glass composition different from the first glass composition; and
    heating the first sheet of glass material and the second sheet of glass material together to a forming temperature above glass transition temperatures of both the first glass composition and the second glass composition while supported by the shaping frame such that central regions of the first and second sheets of glass material deform downward into the open central cavity of the shaping frame, wherein the first sheet of glass material and the second sheet of glass material gravity sag at the same rate so that there are no bath tub shape mismatch defects after the gravity sagging near the edges of the first sheet of glass material;
    wherein T2 is greater than T1,
    wherein a viscosity of the first glass composition at the forming temperature, V1, is greater than a viscosity of the second glass composition at the forming temperature, V2,
    wherein $3.8 \leq T2/T1 \leq 6.0$,
    wherein T1 is between 0.3 mm and 1 mm, and
    wherein V1/V2>2
    wherein a polymer interlayer is located between the first glass layer and the second glass layer.

2. The process of claim 1, further comprising any one of wherein $V1/V2 \leq 100$,
    wherein V1/V2>13,
    wherein T2/T1=3.8 and V1/V2>24, and
    wherein T2/T1=5.8 and V1/V2>72.

3. The process of claim 1, wherein T2 is between 1.5 mm and 4 mm.

4. The process of claim 1, wherein the first glass composition and the second glass composition are soda lime glass or wherein the second glass composition is soda lime glass and the first glass composition is an alkali aluminosilicate glass composition or an alkali aluminoborosilicate glass composition.

5. A process for forming a curved multi-layer glass article comprising:
    supporting a first sheet of glass material on a shaping frame;
    placing a second sheet of glass material on top of the first sheet of glass material, wherein the first sheet of glass material and the second sheet of glass material are both supported by the shaping frame, wherein the first sheet of glass material has a first average thickness, T1, and is formed from a first glass composition and the second sheet of glass material has a first second average thickness, T2;
    heating the first sheet of glass material and the second sheet of glass material together to a forming temperature above glass transition temperatures of both the first glass composition and the second glass composition while supported by the shaping frame; and
    deforming the first sheet of glass material and the second sheet of glass material into curved shapes during heating, wherein the first sheet of glass material and the second sheet of glass material gravity sag at the same rate during the deforming rate so that there are no bath tub shape mismatch defects after the gravity sagging near the edges of the first sheet of glass material;
    wherein $3.8 \leq T2/T1 \leq 6.0$,
    wherein T1 is between 0.3 mm and 1 mm,
    wherein the second sheet of glass material is formed from a second glass composition different from the first glass composition, and wherein the first glass composition compris es a viscosity at the forming temperature, V1, and the second glass composition comprises a viscosity at the forming temperature, V2, wherein V1 is greater than 2*V2,
wherein a polymer interlayer is located between the first glass layer and the second glass layer.

6. The process of claim 5, wherein V1/V2≤100.

7. The process of claim 5, wherein T2 is between 1 mm and 4 mm.

8. The process of claim 5, wherein the first glass composition and the second glass composition are soda lime silicate glass or wherein the second glass composition is soda lime silicate glass and the first glass composition is an alkali aluminosilicate glass composition or an alkali aluminoborosilicate glass composition.

* * * * *